United States Patent Office
3,490,029
Patented Jan. 13, 1970

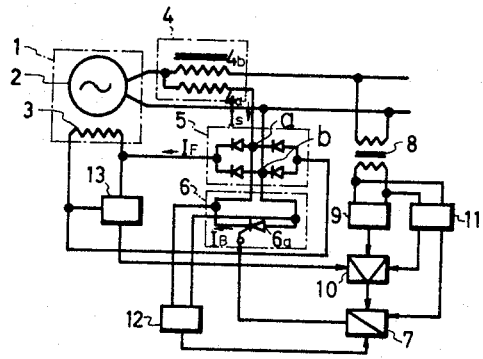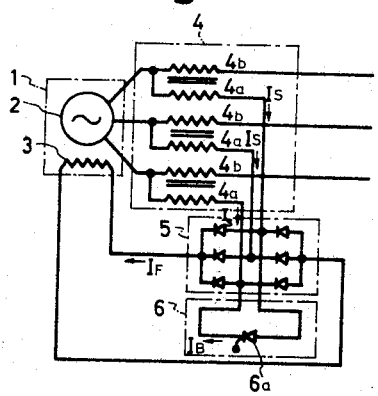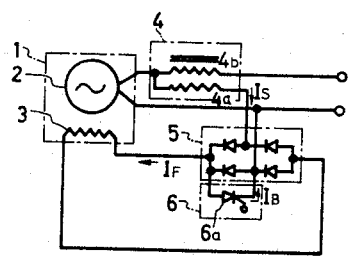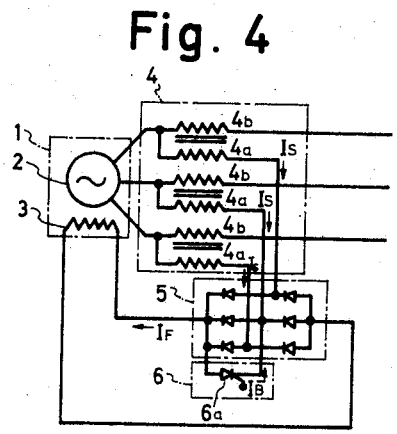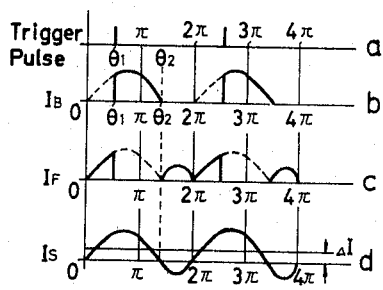

3,490,029
APPARATUS FOR AUTOMATICALLY REGULATING THE OUTPUT VOLTAGE OF A SELF-EXCITING ALTERNATOR
Yoshiaki Kitani and Akira Yamanaka, Suita-shi, Japan, assignors to Negishi Seisakusho Ltd., Osaka-shi, Osaka-fu, Japan, a corporation of Japan
Filed June 5, 1967, Ser. No. 643,612
Claims priority, application Japan, June 20, 1966, 41/40,227
Int. Cl. H02p 9/30
U.S. Cl. 322—20                                   3 Claims

ABSTRACT OF THE DISCLOSURE

An apparatus for automatically regulating the output voltage of a self-exciting alternator in which a component of the field current flows in a shunt circuit. In this invention a full wave rectifier is coupled to change a portion of the alternating output signal of the alternator to a D.C. signal which is fed to the field winding, a thyristor being coupled to the input of the full wave rectifier to short circuit alternate half cycle portions of the signal fed to the full wave rectifier to obtain a signal at the input of the full wave rectifier that is superimposed on the D.C. component.

BACKGROUND OF THE INVENTION

This invention relates to an apparatus for automatically regulating the output voltage of a self-exciting alternator in which the output voltage of the alternator is maintained within a predetermined range by causing a component of the field current to flow in a shunt circuit connected to the exciting circuit of the alternator during a predetermined duration without having the remainder component of the field current flow in the field circuit in accordance with the variations in the load and power factor of the alternator.

Heretofore, it was already known, in an attempt to control the output voltage of a self-exciting alternator to a constant value, that a shunt circuit is connected in the input side of a rectifier provided in the exciting circuit of the alternator and a component of the field current is caused to flow the shunt circuit in accordance with a variation in the load and power factor of the alternator. In such an arrangement, it is necessary to provide a plurality of control elements for the purpose of shunting the field current.

SUMMARY OF THE INVENTION

In order to solve the disadvantage of the prior art, in the invention of subject application a circuit is provided as a shunt circuit in which a single phase-control element is inserted in parallel to the exciting circuit in order to control the phase of the alternating component of the current applied to a rectifier provided in the exciting circuit of the alternator only during its half-cycle. In the self-exciting alternator, the output voltage of the alternator is maintained within a predetermined range by causing a component of the field current flow in the shunt circuit connected to the exciting circuit and not flow in the field circuit within a predetermined duration so that the output voltage of the alternator is maintained in a predetermined range.

It is an object of this invention to provide an apparatus for automatically regulating the output voltage of a self-exciting alternator using a shunt circuit with simple construction to improve the output voltage performance effectively.

BRIEF DESCRIPTION OF THE DRAWING

FIG. 1, FIG. 2, FIG. 3 and FIG. 4 are schematic connection diagrams of embodiments of the apparatus of subject invention, and
FIG. 5 shows the waveforms of phase control appearing in the embodiments referred to above.

DESCRIPTION OF THE PREFERRED EMBODIMENTS

In FIG. 1, in the output circuit of a self-exciting alternator 1 having an armature winding 2 and a field winding 3 is inserted an exciter 4 having a reactor 4a and a current transformer 4b. A current which is proportional to the terminal voltage of alternator 1 is obtained through reactor 4a and a current which is proportional to the load current in alternator 1 is obtained through current transformer 4b. These two currents are combined in their vector senses and quantities and are applied to the input side of a group of rectifiers 5 provided in the exciting circuit of field winding 3. A shunt circuit 6 having a thyristor 6a inserted therein may be connected in parallel in the forward direction to one of the rectifiers in the input side of rectifiers 5 as shown in FIGS. 1 and 2 or may be connected in parallel in the reverse direction to one of the rectifiers in the input side of rectifiers 5 as shown in FIGS. 3 and 4. A trigger signal generator 7 is connected to the trigger electrode of thyristor 6a. A step-down transformer 8 is connected to the output of alternator 1 and a detector 9 is connected to the output of transformer 8 to detect the stepped-down treminal voltage of the alternator after the voltage is converted into a D.C. volage. An amplifier 10 is connected to detector 9 to receive the detected voltage and compare the voltage with a reference voltage provided therein. A constant voltage source 11 supplies a direct current with a constant voltage to trigger signal generator 7 and amplifier 10. A synchronizing circuit 12 is connected across thyristor 6a and takes a synchronizing pulse out of the thyristor to apply the pulse to trigger pulse generator 7 to synchronize it. Phase control of the alternator is effected by the combined operation of trigger signal generator 7 and synchronizing circuit 12. Accordingly, a trigger pulse which triggers thyristor 6a can be completely synchonized with the positive potential of thyristor 6. A damping circuit 13 is connected across field winding 3 and connected to amplifier 10 to apply to the amplifier a negative feedback obtained from the variation in the field voltage.

Trigger signal generator 7, step-down transformer 8, detector 9, amplifier 10, constant voltage source 11, synchronizing circuit 12 and damping circuit 13 are all well-known conventional elements and, therefore, these elements are shown schematically in FIG. 1 and are omitted in FIGS. 2 to 4.

The operation of the apparatus shown in FIG. 1 is explained as follows:

As shown in FIG. 5, when a potential is being applied to thyristor 6a in a forward direction, in other words, the positive side of the potential is being applied to the anode of the thyristor and the negative side of the potential is being applied to the cathode of the thyristor, when a trigger pulse shown angle $\theta$, in FIG. 5a is applied across the gate and the cathode of the thyristor, the thyristor ignites to cause the shunt current $I_B$ to flow as shown in the full line of the sine wave in FIG. 5b. The characteristic feature of shunt circuit 6 of this invention resides in the fact that the shunt current $I_B$ does not reduce to zero at angles $\pi$, $3\pi$, $5\pi$ . . . , which are a half of one cycle, a one and half of one cycle, a two and half of one cycle . . . of the exciting current. This is a transient phenomenon due to the reactance of exciter 4 and the performance of thyristor 6a. In the subject invention, this phenomena is utilized to increase the shunt current and enlarge the range of controlling the output voltage.

The reason why an enlargement of the control range is obtained is explained as follows:

Normally, the exciting current $I_S$ of exciter 4 is supplied to field winding 3 through rectifiers 5. When thyristor 6a ignites at angle $\theta_1$, the exciting current $I_S$ is fedback to the output terminal of alternator 1 as shown in FIGS. 1 and 3 or fedback to exciter 4 as shown in FIGS. 2 and 4, since points a and b in rectifiers 5 are short-circuited. The current $I_F$ which is fedback is shown in FIG. 5c.

As shunt circuit 6 is predetermined to shunt the exciting current only in the half cycle, the exciting current $I_S$ thus obtained is superimposed by a D.C. component $\Delta I$ over the original wave form of the exciting current as shown in FIG. 5d according to the transient phenomena so that the symmetrical performance of the original exciting current in the positive and negative directions cannot be maintained any more to cause the shunt current larger.

The transient phenomena is more concretely explained as follows:

The shunt current $I_B$ is expressed approximately in the following equation:

$$I_B \doteqdot \frac{I_S}{2\sqrt{2}}(1+\cos\theta)$$

wherein $I_S$: exciting current
$\theta$: ignition angle.

As the input side of rectifiers across terminals a and b is short circuited during the operation of shunt circuit 6 between angle $\theta_1$ and angle $\theta_2$, the current $I_F$ fedback to field winding 3 is expressed approximately in the following equation:

$$I_F \doteqdot I_S - I_B \doteqdot \frac{4-\sqrt{2}(1+\cos\theta)}{4}$$

When shunt circuit 6 is opened, that is $\theta=180°$, $\Delta I$ in FIG. 5d becomes to zero so that the current $I_F$ equals to the current $I_S$. When $\theta=60°$, $\theta=0°$ etc. the current $I_F$ and $I_B$ are given in the following table.

| | Ignition angle, $\theta°$ | Field current, $I_F$ | Shunt current, $I_B$ |
|---|---|---|---|
| I | 180 | $I_S$ | 0 |
| II | 90 | $0.65I_S$ | $0.35I_S$ |
| III | 60 | $0.47I_S$ | $0.53I_S$ |
| IV | 30 | $0.34I_S$ | $0.66I_S$ |
| V | 0 | $0.3I_S$ | $0.7I_S$ |

The terminal voltage of the alternator is applied to and detected by detector 9 through step-down transformer 8 and the output of detector 9 is applied to amplifier 10. The output of constant voltage source 11 is applied to trigger signal generator 7 and amplifier 10. Trigger signal generator 7 generates trigger signals corresponding to the output of amplifier 10. More particularly, trigger signal generator 7 generates trigger pulses in proportion to the deviation of the reference voltage provided in amplifier 10 from the voltage detected by detector 9. The synchronizing pulses coming from synchronizing circuit 12 are applied to trigger signal generator 7 to synchronize the trigger signal with the reference voltage. Consequently, the degree of phase shift is controlled and the shunt current $I_B$ which is controlled by the ignition angle flows into shunt circuit 6 and controls the field current $I_F$ so that the terminal voltage of the alternator is controlled in accordance with the variation in the load and power factor of the alternator to maintain the output voltage within a predetermined range.

As explained above, in subject invention a series of transient phenomena which terminate completely in each cycle and occur again over cycles of the shunt current, is utilized to maintain the output voltage within a range. The range can be enlarged concisely and advantageously as shown in $I_B$ and $I_F$ given in the table above by using a simple shunt circuit utilizing only a single shunt current control element such as a thyristor. The field current can be shunted to the degree shown by V in the table when the circuits shown in FIGS. 1, 3 and 4 are utilized and to the degree shown by III when the circuit shown in FIG. 2 is utilized, this shunting ability being recognized to be the largest range attainable only by a single shunt current control element.

What is claimed is:

1. In a self-exciting alternator having a field winding energized by a field current where the alternating output voltage of the alternator is maintained within a predetermined range by causing a component of the field current to flow in a shunt circuit connected to an exciting circuit of the alternator in accordance with the variations in a load and power factor of the alternator, an apparatus for automatically regulating the output voltage of the alternator comprising a full wave rectifier coupled to feed a rectified portion of the alternating output signal from said alternator to said field winding, and means coupled to short circuit alternate half cycle portions of the signal fed to said full wave rectifier to form a signal at the input of said full wave rectifier that is superimposed on a D.C. signal.

2. The structure of claim 1 wherein said means comprises a thyristor coupled to the input side of the rectifier.

3. The structure of claim 1 wherein said means comprises a thyristor connected to the rectifier in the reverse direction thereto.

References Cited

UNITED STATES PATENTS

| 2,975,352 | 3/1961 | Ford | 322—25 X |
| 3,217,229 | 11/1965 | Ballard | 322—25 X |
| 3,369,171 | 2/1968 | Lane | 322—68 |
| 3,378,754 | 4/1968 | Rosenberg | 322—28 |
| 3,388,315 | 6/1968 | Yarrow | 322—68 X |

BENJAMIN DOBECK, Primary Examiner

H. HUBERFELD, Assistant Examiner

U.S. Cl. X.R.

322—24, 28, 68, 73